(12) United States Patent
Yamakawa

(10) Patent No.: US 6,243,128 B1
(45) Date of Patent: Jun. 5, 2001

(54) IMAGE FORMING APPARATUS IN WHICH ADJUSTMENT FOR FORMING IMAGE IN RECTANGULAR FORM IS EASILY DONE AND METHOD FOR MAKING THE SAME APPARATUS

(75) Inventor: Takeshi Yamakawa, Fujisawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 09/249,846

(22) Filed: Feb. 16, 1999

(30) Foreign Application Priority Data

Feb. 16, 1998 (JP) .................................................. 10-032836

(51) Int. Cl.⁷ ...................................................... B41J 2/435
(52) U.S. Cl. .......................... 347/263; 347/245; 347/138
(58) Field of Search ..................................... 347/263, 242, 347/245, 257, 138, 152, 170, 116–119; 250/231.14

(56) References Cited

U.S. PATENT DOCUMENTS

| 4,265,524 | * | 5/1981 | Compton et al. | 354/65 |
| 4,987,302 | * | 1/1991 | Meyer et al. | 250/231.14 |
| 5,237,348 | * | 8/1993 | Blanding et al. | 347/138 |

OTHER PUBLICATIONS

U. S. application No. 08/916,959, filed Aug. 25, 1997, pending.
U. S. application No. 09/039,394, filed Mar. 16, 1998, pending.

* cited by examiner

Primary Examiner—N. Le
Assistant Examiner—Lamson D. Nguyen
(74) Attorney, Agent, or Firm—Oblon, Spivak, McClelland, Maier & Neustadt, P.C.

(57) ABSTRACT

An image forming apparatus includes a photoconductor, a light source that emits a light beam, and a scanning device that guides a light beam emitted from the light source onto a surface of the photoconductor so as to scan the surface of the photoconductor with the light beam to form a latent image thereupon. A housing, to which the light source and the scanning device are mounted, is mounted to a main body of the apparatus by a stay. The housing is supported by the stay such that an angle of a scanning direction of the light beam relative to a direction in which a surface of the photoconductor moves is adjustable so as to be at a substantially right angle and thereby an image is formed in a rectangular form by way of rotating the housing.

16 Claims, 8 Drawing Sheets

IMAGE FORMING APPARATUS IN WHICH ADJUSTMENT FOR FORMING IMAGE IN RECTANGULAR FORM IS EASILY DONE AND METHOD FOR MAKING THE SAME APPARATUS

BACKGROUND OF THE INVENTION

1. Field of the Invention

The present invention relates to an image forming apparatus having an image writing device for writing a latent image on a surface of a photoconductor by deflecting a light beam by way of an optical defector and exposing the surface of the photoconductor with the deflected light beam, and more particularly to an image forming apparatus in which adjustment of a scanning direction of the light beam so as to be at a right angle relative to a direction in which a surface of the photoconductor moves such that a rectangular latent image is easily formed.

2. Discussion of the Background

It is well known that digital copying machines using electrophotography include an image writing device for writing a latent image on a surface of a photoconductor by deflecting a light beam by way of an optical defector and exposing the surface of the photoconductor with the deflected light beam.

FIG. 1 illustrates an example of such a digital copying machine. In FIG. 1, digital copying machine 100 includes an image reading device 111, a printing device 112 and an automatic document feeding device 113. The automatic document feeding device 113 separates each of the original document sheets set in the automatic document feeding device 113 and feeds the separated sheets to a contact glass 114 into a reading position. After an image of the original document is read, the automatic document feeding device 113 discharges the sheet from the reading position on contact glass 114.

FIG. 2 is a sectional drawing illustrating image reading device 111. Image reading device 111 includes a first carriage A having a light source including an illuminating lamp 115, a reflecting mirror 116, and a first mirror 117 (shown in FIG. 1). A second carriage B of image reading device 111 includes a second mirror 118 and a third mirror 119. When reading an original document placed on contact glass 114, first carriage A travels at a constant speed while second carriage B travels at a speed half that of first carriage A, thereby optically scanning the original document on the contact glass 114. The original document on contact glass 114 is illuminated by illuminating lamp 115 and reflecting mirror 116. As shown in FIG. 1, the light reflected by the original document is directed to a charge-coupled device (CCD) 122 by a lens 121 via first mirror 117, second mirror 118, third mirror 119, and a color filter 120. CCD 122 converts the received light image to electrical signals and outputs analog image signals representing the image of the original document. Referring again to FIG. 2, after the image of the original document is read, first carriage A and second carriage B return to respective home positions (represented by the solid line depictions) from the positions where image reading ends (represented by the line-and-dot line depictions). CCD 122 may be configured such that three arrays of CCD elements are arranged for R (red), G (green) and B (blue), respectively, for reading a original color document.

Referring now to FIG. 1, the analog image signals output from CCD 122 are converted into digital image signals by an analog-to-digital converter (not shown) and various kinds of image processing, such as converting multi-value data into binary data and vice versa, gradation level conversion, magnification ratio change, image editing and so on, are applied to the digital image signals by an image processing circuit included on image processing board 123.

In order to prepare photoconductor drum 125 to receive a latent image, photoconductor drum 125 is driven by a drive unit (not shown) and the surface of the photoconductor drum 125 is uniformly charged by a charging device 126. After the digital image signals have been processed with image processing board 123, they are sent to a semiconductor circuit board (not shown), and a latent image is formed on the surface of photoconductor drum 125 according to the digital image signals with an image exposure operation performed by a laser beam scanning device 127. The latent image on the photoconductor drum 125 is then developed with toner to form a visible toner image by developing device 128.

A transfer sheet is fed to a registration roller 136 from a selected one of sheet cassettes 133, 134 and 135, toward the photoconductor drum 125 at a timing to register the leading edge of the transfer sheet with the leading edge of a toner image formed on the surface of the photoconductor drum 125. The toner image on photoconductor drum 125 is transferred onto the transfer sheet with transfer device 130. The transfer sheet carrying the toner image is separated from the photoconductor drum 125 with separating device 131 and is conveyed by conveying device 137 to fixing device 138, where the toner image is fixed onto the transfer sheet. The transfer sheet carrying the fixed toner image is then discharged onto an exit tray 139. The surface of the photoconductor drum 125 is cleaned with cleaning device 132 after the transfer paper is separated such that residual toner is removed from the surface of photoconductor drum 125.

FIG. 3 is a schematic drawing illustrating the construction of the laser beam scanning device 127 and the relative positions of scanning device 127 and photoconductor drum 125. Laser beam scanning device 127 includes a semiconductor laser unit 140 having a semiconductor laser. A laser beam light emitted from the semiconductor laser is converted to a parallel light flux with a collimate lens (not shown) in the semiconductor laser unit 140. The parallel light flux is then reformed to a predetermined shape by passing through an aperture (not shown) in the semiconductor laser unit 140. The reformed light flux is converged in the sub scanning direction with cylindrical lens 141 and is thereby directed onto a surface of a polygonal mirror 142. Polygonal mirror 142 is formed in a polygonal shape and is rotated at a constant speed in a fixed direction with motor 143 (illustrated in FIG. 1). The rotation speed of the polygonal mirror 142 is determined according to the rotation speed of the photoconductor drum 125, the writing resolution of the laser beam scanning device 127, and the number of surfaces of the polygonal mirror 142.

The laser beam directed onto the polygonal mirror 142 is deflected by a reflecting surface of the polygonal mirror 142 at an equiangular velocity and is thereby directed into an fθ lens 144. The fθ lens 144 is configured to convert the laser beam deflected by the polygonal mirror 142 at equiangular velocity so as to scan the surface of the photoconductor drum 125 at a constant linear velocity. The laser beam is directed to the surface of the photoconductor drum 125 via reflecting mirror 145 and dust-proof glass 146. The fθ lens 144 also has a surface tilt correcting function, which causes a portion of the laser beam passing through fθ lens 144 at positions out of the image forming area, to be reflected by a synchronization detection mirror 147 so as to be detected by a synchronization detection sensor 148. The synchronization detection sensor 148 outputs a detect signal in accordance with the collision of the laser beam thereupon such that a synchronization signal for aligning a writing start position for each scanning in the main scanning direction (indicated by an arrow in FIG. 3) is obtained.

Laser beam scanning device 127, as described above, is attached to a housing of a main body of the digital copying machine 100 such that a latent image is formed on the surface of the photoconductor drum 125 with the laser beam in a rectangular form having a right angle at each corner, i.e., when a rectangular latent image formed on the surface of the photoconductor drum 125 with the laser beam and the latent image is developed with toner, one side of the rectangular toner image is perpendicular to the direction in which the photoconductor drum 125 rotates (parallel to the axis of the photoconductor drum 125) and the other side of the rectangular toner image is parallel to the direction in which the photoconductor drum 125 rotates (perpendicular to the axis of the photoconductor drum 125), or when the rectangular toner image is transferred onto a transfer sheet, sides of the rectangular toner image are parallel to edges of the transfer sheet respectively or each line extending from an end of a side of the rectangular image is perpendicular to an edge of the transfer sheet. The above feature that an image is formed in a rectangular form is realized if the laser beam of laser beam scanning device 127 scans the surface of photoconductor drum 125 in a direction substantially perpendicular to the direction in which photoconductor drum 125 rotates. Laser beam scanning device 127 is therefore attached to the housing of the main body of the digital copying machine such that the positional relationship between the laser beam scanning device 127 and the photoconductor drum 125 is set and fixed such that the scanning direction of the laser beam is substantially perpendicular to the direction in which the photoconductor drum 125 rotates so that a latent image is formed in a rectangular form. In some image forming apparatuses, relevant parts, such as for example a mirror, are made adjustable, such that, when the apparatus is shipped from the assembling factory, the scanning direction of the laser beam can made perpendicular to the direction in which the photoconductor drum rotates so as to form an image in a rectangular form by way of adjusting the relevant parts.

However, even when a laser scanning device is attached to a housing of a main body of an image forming apparatus such that a desired positional relationship between the scanning device and a photoconductor drum for making the scanning direction of the laser beam perpendicular to the rotation direction of the photoconductor (so as to forming an image in a rectangular form) is accomplished as described above, such a positional relationship may be lost during transportation of the apparatus to a user's cite or due to the condition of the place where the apparatus is placed at the user' site. In particular, when the apparatus is placed on an uneven or inclined plane, thereby distorting the apparatus, the desired positional relationship between the laser beam scanning device and the photoconductor drum may be lost. For example, the surface of the photoconductor drum may be deviated from the position where an image is formed in a rectangular shape with a laser beam of the laser beam scanning device, and thereby, the image is formed, for example, in a parallelogram.

Further, because the laser beam scanning device is generally located at the rear side of the apparatus and is packaged in a tightly sealed construction for preventing optical elements which are included in the scanning device being stained with dust, even if optical elements of the scanning device, such as mirrors, are made to be adjustable as above, proper adjustment of such optical elements is not easily accomplished at a user's site. Furthermore, addition of such adjusting feature increases the cost of the apparatus.

SUMMARY OF THE INVENTION

The present invention has been made in view of the above-discussed problems and addresses and resolves the above-described and other problems. Preferred embodiments of the present invention provide an image forming apparatus in which adjustment of a scanning direction of a light beam so as to be substantially perpendicular to a direction in which a surface of a photoconductor moves so that a latent image is formed in a substantially rectangular form is easily performed without increasing the cost of the apparatus.

According to a preferred embodiment of the present invention, an image forming apparatus includes a photoconductor, a light source that emits a light beam, and a scanning device that guides a light beam emitted from the light source onto a surface of the photoconductor so as to scan the surface of the photoconductor with the light beam to form a latent image thereupon. A housing, to which the light source and the scanning device are mounted, is supported by a stay and the housing is mounted to a main body of the apparatus via the stay.

According to the invention, the housing is supported by the stay such that an angle of a scanning direction of the light beam relative to a direction in which a surface of the photoconductor moves, is adjustable so that the scanning direction can be arranged at a substantially right angle relative to the direction of rotation of the housing. A pair of the stays may be arranged in substantially parallel to a widthwise direction of the photoconductor. A positioning pin may also be provided to the housing, and a positioning pin insertion hole, through which the positioning pin is inserted, is provided for one of the pair of the stays, wherein the housing is rotated around the positioning pin.

A driver insertion hole is provided to each of the housing and the stay, and the housing is rotated relative to the stay by inserting a tip end of the driver into the driver insertion hole of the housing and the stay and by rotating the driver.

Further, a scale for indicating a rotated position of the housing may provided to the stay.

A division of the scale may made such that rotation of the housing relative to the stay over one division of the scale corrects a deviation of the angle of the scanning direction of the light beam relative to the direction in which the surface of the photoconductor moves, from a right angle in an amount corresponding to, when an image of longitudinal and widthwise lines, the widthwise line extending from an end point of the longitudinal line at a right angle relative to the longitudinal line over a maximum widthwise length of the image, is formed, in the formed image, the deviation being equal to a distance of 0.5 mm or 1 mm between the connected ends of the longitudinal and widthwise line images and a point of the longitudinal line image or a point of a longitudinal line extending from the connected ends point, where a line extended from the other end point of the widthwise line image in perpendicular to the longitudinal line image crosses.

BRIEF DESCRIPTION OF THE DRAWINGS

A more complete appreciation of the present invention and many of the attendant advantages thereof will be readily obtained as the same becomes better understood by reference tot he following detailed description of when considered in conjunction with the accompanying drawings, wherein.

DETAILED DESCRIPTION OF THE PREFERRED EMBODIMENTS

Figure 1:
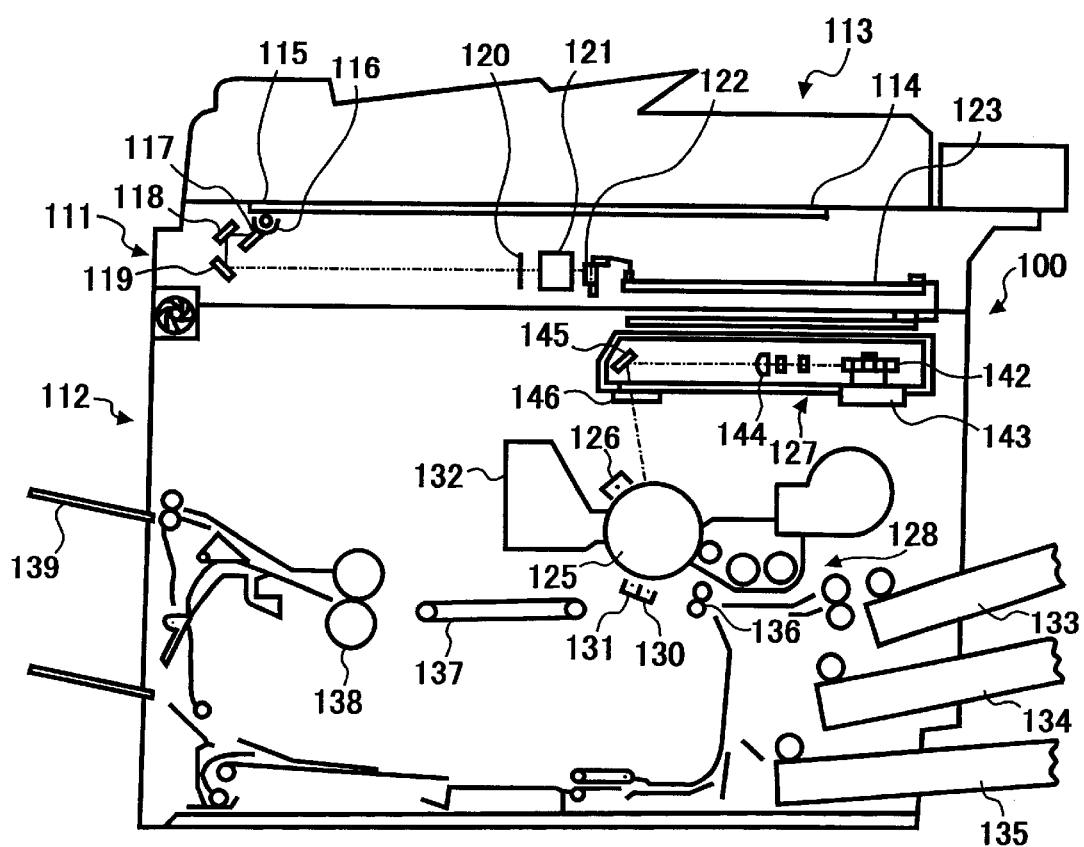
FIG. 1 is a schematic drawing illustrating an example of a digital copying machine as an image forming apparatus.
Figure 2:
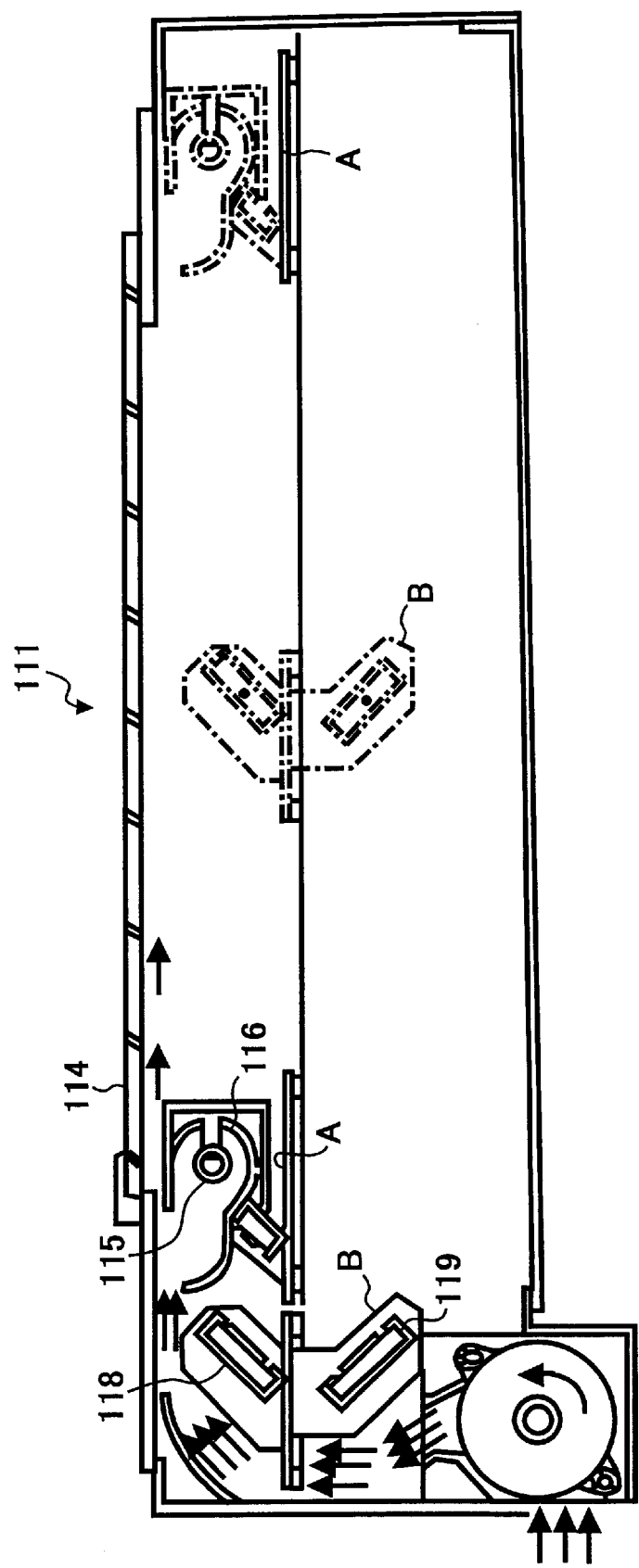
FIG. 2 is a sectional drawing illustrating an image reading device of the digital copying machine illustrated in FIG. 1.
Figure 3:
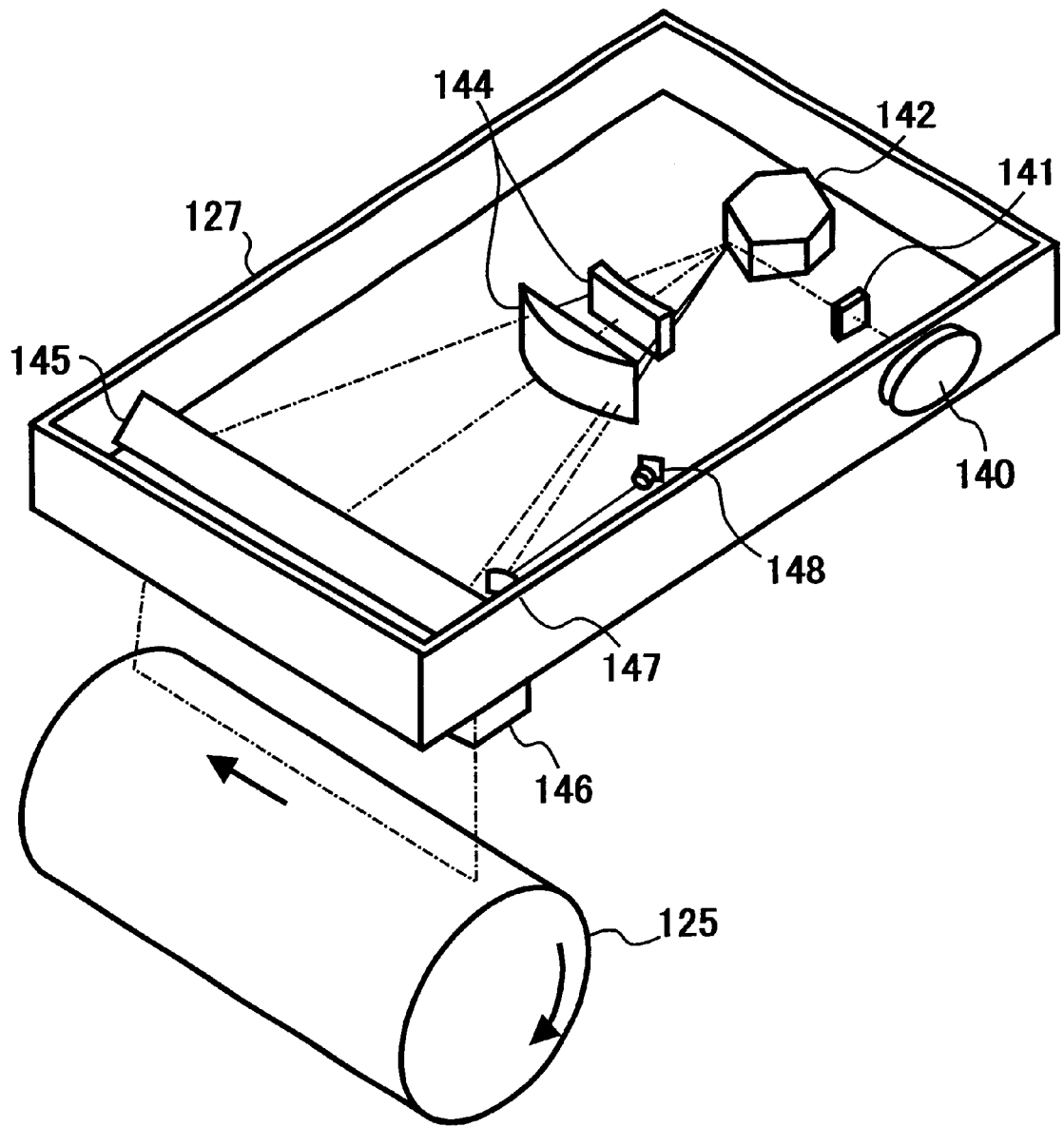
FIG. 3 is a schematic drawing illustrating the construction of a laser beam scanning device and the positional relationship between the laser beam scanning device and a photoconductor drum in the digital copying machine of FIG. 1.

Referring now to the drawings, wherein like reference numerals designate identical or corresponding parts throughout several views, preferred embodiments of the present invention are now described.

Figure 4:
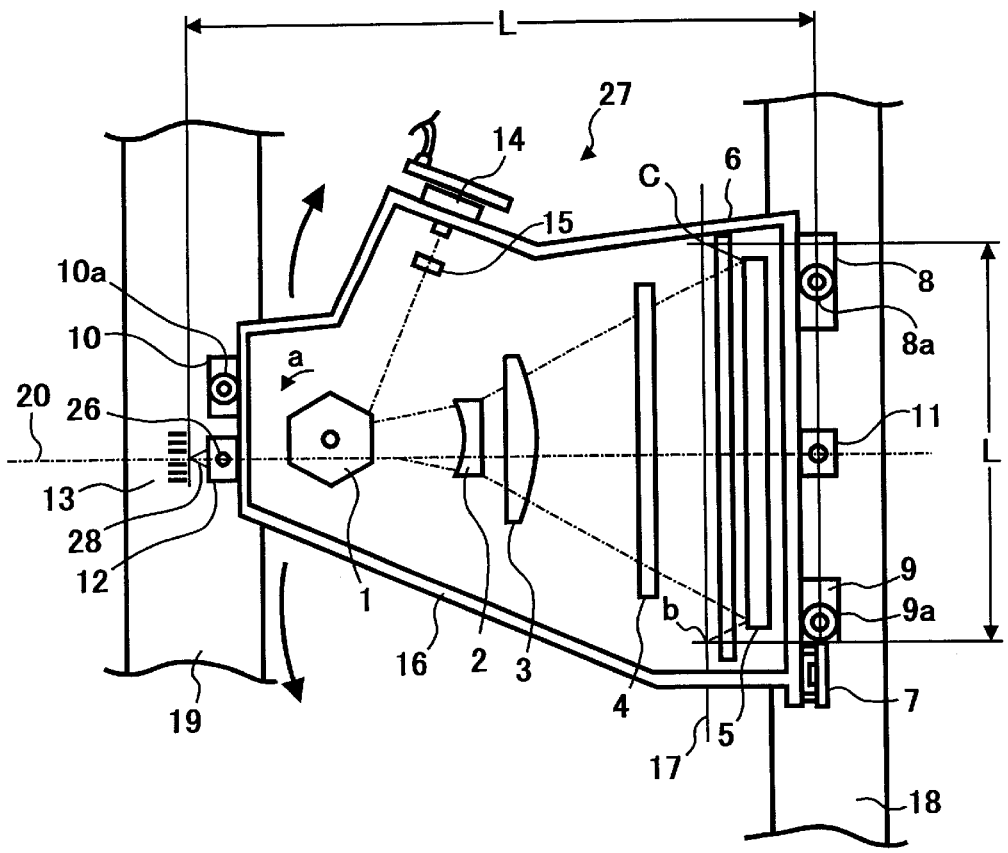
FIG. 4 is a plan view illustrating a structure of a housing, to which a laser beam scanning device is mounted, and a stay supporting the housing, according to an embodiment of the present invention.
Figure 5:
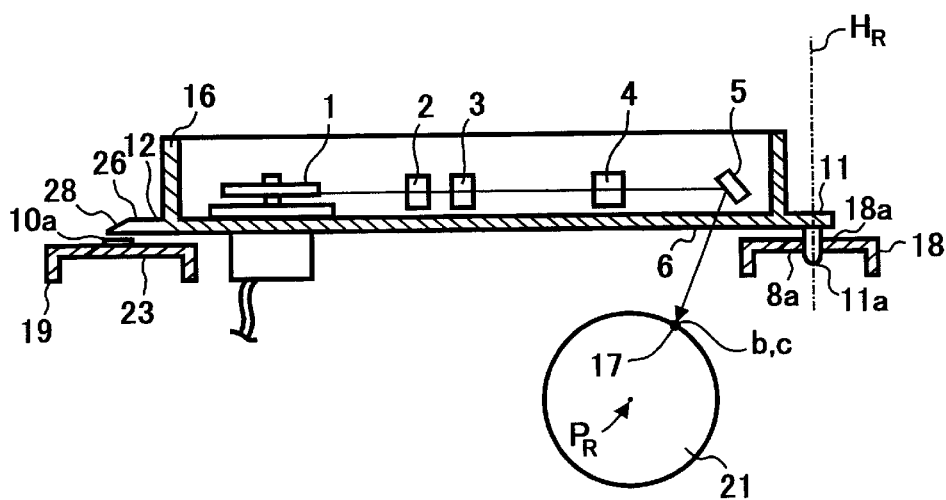
FIG. 5 is a sectional view of the housing and the stay of FIG. 4, illustrating the relationship between the scanning device and the photoconductor drum.

As shown in FIGS. 4 and 5, a housing 16 houses therein components of laser beam scanning device 27, and is tightly sealed for preventing the components from being stained by dust, and the like. A polygonal mirror 1 is arranged at one end portion of the housing 16 and a mirror 5 for deflecting a laser beam in a direction to impinge a surface of the photoconductor drum 21, is arranged at the other end portion of the housing 16. A laser unit 14 is arranged in a position to enable a laser beam emitted from the laser unit 14 to impinge onto mirror 5 by being deflected by polygonal mirror 1. A collimator lens 15 is arranged in a light path between laser unit 14 and the polygonal mirror 1, and fθ lenses 2 and 3 and surface tilt correcting lens 4 are arranged between the polygonal mirror 1 and the mirror 5. Lenses 2, 3, 4 and 15 accomplish fθ characteristics. Arrow a indicates the direction in which polygonal mirror 1 rotates and ends b and c are the widthwise ends of a scanning line 17 of a laser beam.

Housing 16 is positioned so as to span over both a right side stay 18 and a left side stay 19, and is attached to these stays 18 and 19 such that a laser beam reflected by mirror 5 passes through an opening 6 and scans the surface of photoconductor drum 21. Stays 18 and 19 are attached to a side plate (not shown) of a main body of the image forming apparatus. Photoconductor drum 21 is rotatably supported by the side plate and is driven to be rotated by a rotation drive device (not shown).

Three protruding plates 8, 9 and 11 are provided to a lower edge of housing 16, at the side of the mirror 5 and two additional protruding plates 10 and 12 are similarly provided to the lower edge at the side of the polygonal mirror 1. Each of plates 8, 9, 11, 10, 12 are made substantially parallel to the bottom surface of housing 16. A pin 11a is provided to plate 11 at the bottom surface thereof, protruding substantially perpendicularly downward. When the position of housing 16 is adjusted relative to photoconductor drum 21 (described in detail later), housing 16 is rotated with pin 11a being the center of rotation, defining housing rotational axis $H_R$. A jig pin passing hole 26 for receiving a jig pin is formed in protrusion plate 12. An insertion hole 18a for receiving pin 11a is formed in right side stay 18 and a jig pin insertion hole 23 for receiving the jig pin via hole 26 is provided in left side stay 19. Jig pin insertion hole 23 is provided for positioning housing 16 in a default position during assembly. Preferably, housing 16 is positioned in such a default position by inserting pin 11a into insertion hole 18a provided in right side stay 18 and inserting the jig pin into the matched jig pin insertion hole 23 and jig pin passing hole 26.

Washers 8a, 9a and 10a are arranged at the bottom surfaces of plates 8, 9 and 10, respectively, and the accuracy of the vertical positional relationship between the housing 16 and the photoconductor drum 21 is accomplished and is maintained by arranging the bottom surface of the plates 8, 9 and 10 on stays 18 and 19 via washers 8a, 9a and 10, respectively. After the vertical positional relationship between housing 16 and photoconductor drum 21 is accomplished, potions of stays 18 and 19 supporting plates 8, 9 and 10, respectively, are connected and fixed with screws.

Therefore, when adjusting the relative angular position of housing 16 and photoconductor drum 21 such that the scanning direction of the laser beam is made perpendicular to the direction in which the photoconductor drum 21 rotates (so that a rectangular image is formed), housing 16 is rotated around pin 11a either in a clockwise or a counter-clock wise direction after loosening the screws for plates 8, 9 and 10. After the desired relative angular position of housing 16 and photoconductor drum 21 is obtained, housing 16 is fixed to stays 18 and 19 again by the screws. In other words, housing 16 rotates about axis $H_R$, such that protrusion rotates in a plane (not shown) which is substantially parallel to the rotational axis $P_R$ of photoconductive drum 21. Thus, the relative angular position of housing 16 and photoconductor drum 21 can be easily adjusted at a user's site without increasing the cost of the apparatus.

Further, with the provision of a protrusion 28 to housing 16 and a scale 13 to left side stay 19, the angular position of the housing 16 can be easily measured. In this example, an indicia on scale 13 for indicating the default position is made longer than other indicia of the scale 13, so that the angular position of the housing from the default position can be easily identified.

Figure 6A:
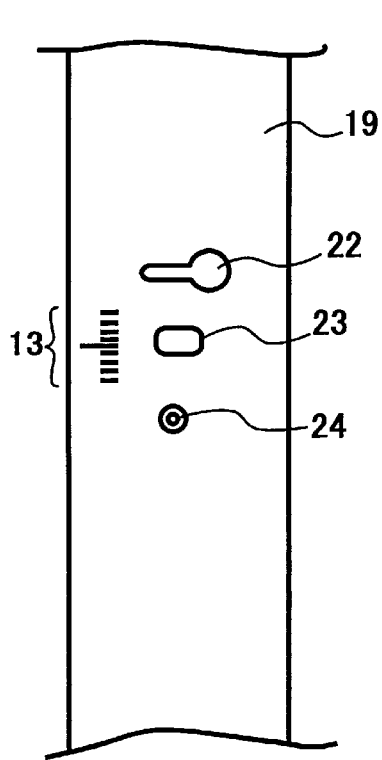
FIGS. 6(a) and 6(b) are plan views illustrating the relationship between the housing and the stay, FIG. 6(a) being a plan view of the stay.
Figure 6B:
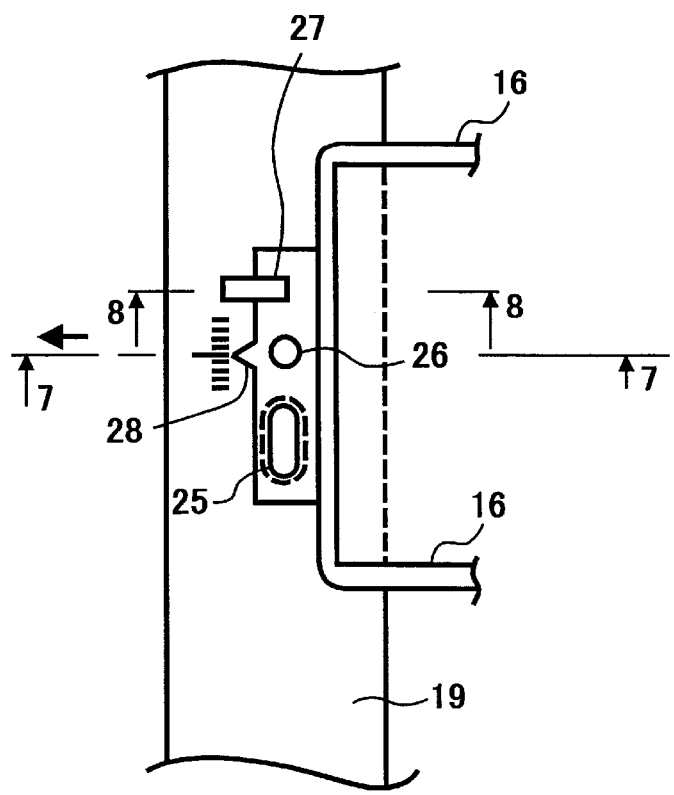

As viewed in FIGS. 6(a) and 6(b), scale 13 is provided on an upper surface of left side stay 19 and jig pin inserting hole 23 for positioning housing 16 at the default position is formed at the right side of scale 13. A hole 22 for inserting a driver is formed above jig pin inserting hole 23 (as shown in FIG. 6(a)) and a screw inserting hole 24 for inserting a screw to fix housing 16 to left side stay 19 is provided below jig pin inserting hole 23. An elongated hole 25 for inserting a screw to pass through hole 24, jig pin passing hole 26 for passing a jig pin, and a groove 27 to insert therein a driver, are provided at a side of housing 16 as illustrated in FIG. 6(b). Protrusion 28 is formed at a position left of jig pin passing hole 26, as viewed in FIG. 6(b), so as to point towards scale 13. Right side stay 18 and housing 16 are configured in substantially the same structure as in the previous embodiment. A washer (not shown) is provided at the bottom surface of the elongated hole 25.

Figure 7:
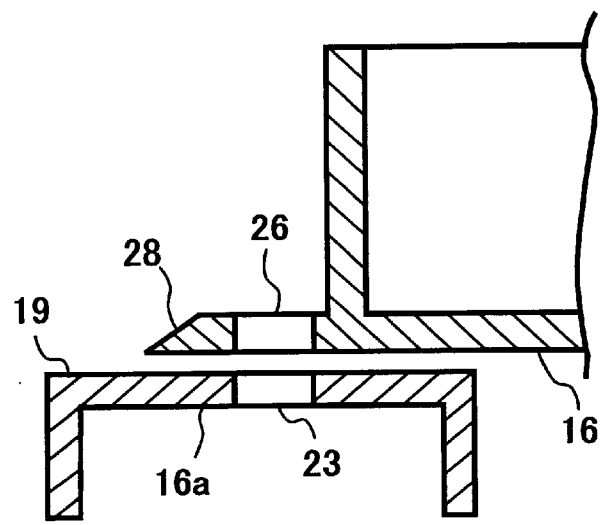
FIG. 7 is a section view illustrating the relationship between the housing and the stay at line 7.—7. indicated in FIG. 6(b)
Figure 8:
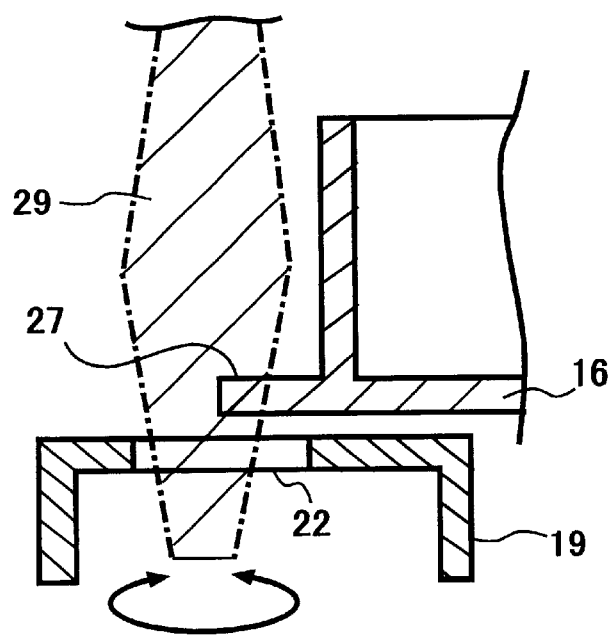
FIG. 8 is a section view illustrating the relationship between the housing and the stay at the part where a driver is inserted, at line 8.—8. indicated in FIG. 6(b)
Figure 9:
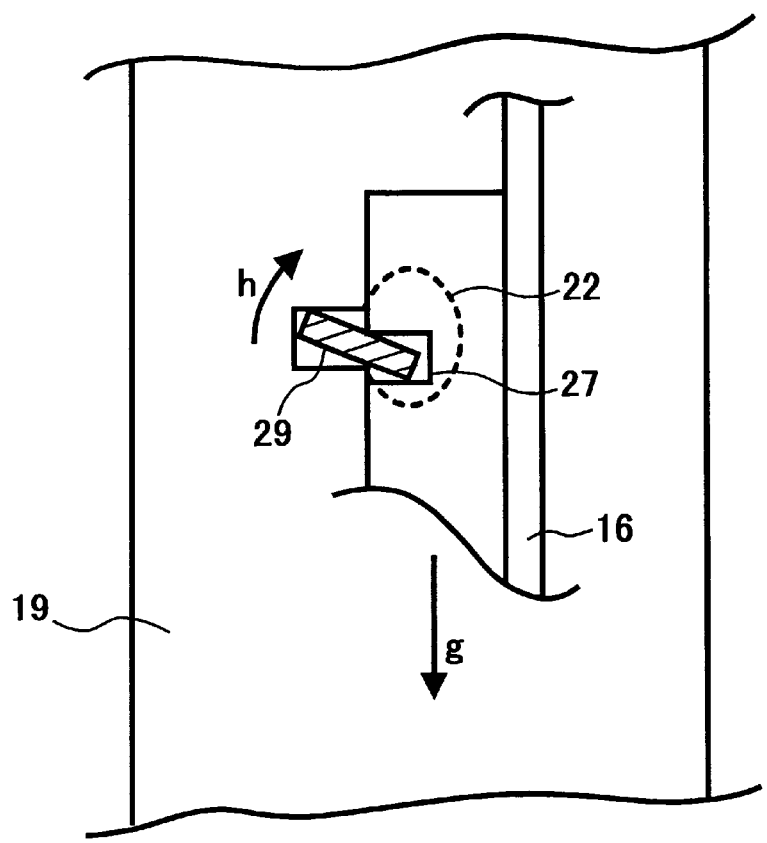
FIG. 9 is a plan view illustrating a state where the driver is twisted for adjusting the relationship.

Referring now to FIGS. 6(a), 6(b) and 7, when adjusting the angular position of housing 16 from the default position, a jig pin (not shown) is preferably inserted in jig pin inserting hole 23 and jig pin passing hole 26, while groove 27 is overlapped with the driver inserting hole 22, and elongated hole 25 with screw hole 24. The jig pin is removed in this state and a driver 29 is then inserted through groove 27 into driver inserting hole 22. Driver 29 is then twisted as illustrated by the arrow in FIG. 8. If driver 29 is twisted, for example, in a direction indicated by an arrow "h" in FIG. 9, housing 16 is moved relative to left side stay 19 in the direction indicated by arrow g in FIG. 9. With this twisting movement of driver 29, referring now to FIGS. 4 and 5, the angle of the scanning line 17 relative to the direction in which the photoconductor drum 21 rotates, or the angle relative to the axial direction (the longitudinal direction) of the photoconductor drum 21, is adjusted. Because housing 16 rotates around the positioning pin 11a, the relative position of respective optical components which are mounted in the housing 16 is not changed with this adjustment. Furthermore, the length of the optical path is not changed and is kept the same. Therefore, the positional relationship between housing 16 and photoconductor drum 21 is adjusted so as to form an image in a rectangular form without deteriorating other optical characteristics, such as, for example, the diameter of the optical beam, and thereby without deteriorating the quality of a resulting image.

Scale 13 provided on the upper surface of left side stay 19 may be used simply for generally identifying the amount of angular movement of housing 16 relative to left side stay 19. However, if the image is not formed in a rectangular form after adjusting the positional relationship between housing 16 and photoconductor drum 21, as describer above, the positional relationship between housing 16 and photoconductor drum 21 has to be repeated. Therefore, if the amount of the deviation of the form of an image from a rectangular shape, which can be corrected by way of rotating housing 16 over one division of scale 13, is known in advance, the deviation of an image from a rectangular form can be corrected, so that the image is formed in a rectangular form, at one time by simply rotating the housing 16 for a required number of the divisions of the scale 13 and thereby the time for the adjustment can be saved.

Figure 10:
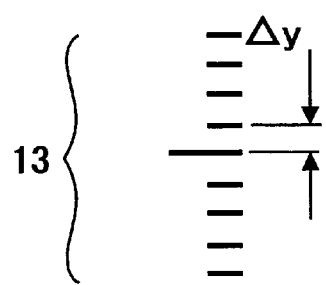
FIG. 10 is a schematic drawing illustrating an example of a distance between each division of a scale provided on the stay.
Figure 11A:
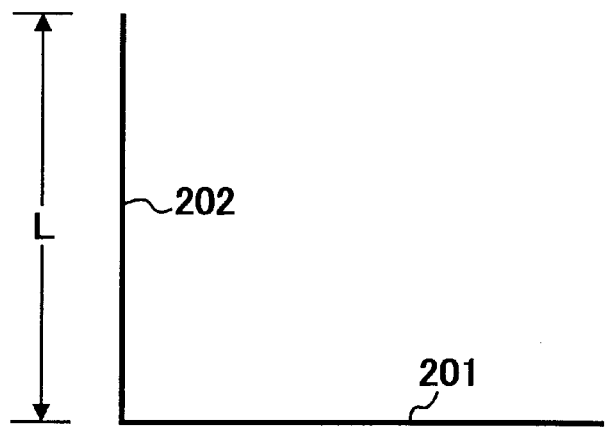
FIGS. 11(a) and 11(b) are diagrams explaining that an image is not formed in a rectangular form.
Figure 11B:
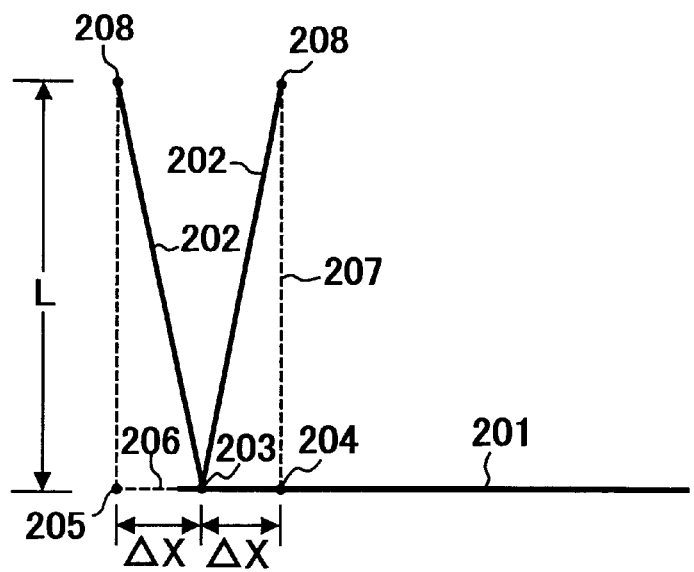

Referring now to FIGS. 1, 10 and 11, assuming that the width of an image is L, the amount of a deviation of the form of an image, from a rectangular form, is $\Delta x$ (FIGS. 11(a) and 11(b)), the distance from the rotational axis of plate 11 to scale 13 is 1 (FIG. 1), and the width between each division of scale 13 is $\Delta y$ (FIG. 10), the following formula stands;

$\Delta y/1 = \Delta x/L$

Here, the amount of the deviation of the form of an image from a rectangular form ($\Delta x$) is measured by forming, for example, an image of a widthwise line and a longitudinal line which are connected to each other forming a right angle at the connected point as illustrated in FIG. 11(a). In FIG. 11(a), a widthwise line 202 extends from one end of longitudinal line 201, perpendicular to longitudinal line 201, over a maximum width L of the image. When the size of the image is A3, for example, the length of line 202 is set shorter than the width of the A3 size, 297 mm, to 290 mm, for example. The longitudinal line image is formed, for example, close to a left side edge of a transfer sheet in the direction the sheet travels.

Assuming that the above image of the longitudinal and widthwise lines is formed deviated from a rectangular form, as illustrated in FIG. 11(b), the amount of the deviation ($\Delta x$) of the image from a rectangular form is expressed in terms of the distance between the connected ends point 203 of the longitudinal and widthwise line images 201 and 202 and a point 204 of the longitudinal line image 201 or a point 205 of a longitudinal line 206 extending from the connected ends point 203 of the longitudinal and widthwise line images 201 and 202, where a perpendicular line 207 from the other end point 208 of the widthwise line image 202 crosses.

If the amount of the deviation $\Delta x$ is, for example, 0.5 mm, the width of the image L is 290 mm and the distance from the rotation center of the protruded plate 11 to the scale is 400 mm, $\Delta y = \Delta x \times 1/L = 0.69$ mm.

Accordingly, if the distance between each division of scale 13 is made to 0.69 mm, when adjusting the positional relationship between housing 16 and photoconductor drum 21 so as to form an image in a rectangular form, the deviation distance of 0.5 mm from a rectangular form is corrected by way of rotating housing 16 for one division of scale 13. Therefore, if the deviation from a rectangular form is, for example, 0.5 mm, the deviation can be corrected by simply rotating housing 16 for one division of scale 13 and if the deviation is 1 mm, the deviation can be corrected by rotating housing 13 for two divisions of scale 23. Thus, the operation of adjusting the positional relationship between housing 16 and photoconductor drum 21 such that an image is formed in a rectangular form is simplified and the time for the adjustment is saved.

Numerous additional modifications and variations of the present invention are possible in light of the above teachings. It is therefore to be understood that within the scope of the appended claims, the present invention may be practiced otherwise than specifically described herein.

This application is based on Japanese patent application No. 10-032836 filed in the Japanese Patent Office on Feb. 16, 1998, the entire contents of which are hereby expressly incorporated by reference.

What is claimed as new and is desired to be secured by Letters Patents of United States:

1. An image forming apparatus, comprising:
   a photoconductor;
   a scanning device configured to guide a light beam emitted from a light source onto a surface of said photoconductor so as to scan the surface of the photoconductor with the light beam to thereby form a latent image thereupon;
   a housing to which said light source and said scanning device are mounted;
   at least one stay positioned and configured to rotatably mount said housing to said image forming apparatus such that a scanning line of a light beam guided by said scanning device can be aligned to a longitudinal direction of the photoconductor by rotating said housing.

2. The image forming apparatus of claim 1, further comprising a developing device configured to develop the latent image with toner to form an image.

3. The image forming apparatus of claim 1, wherein said at least one stay is configured to allow said housing to rotate such that a scanning direction of a light beam can be adjusted to be at a substantially right angle to the direction in which said photoconductor rotates.

4. The image forming apparatus of claim 1, further comprising a light source configured to emit a light beam.

5. The image forming apparatus of claim 1, wherein:
said at least one stay comprises a first stay and a second stay arranged substantially parallel to the first stay in a widthwise direction of said photoconductor;
said housing includes a positioning pin; and
at least one of the first and second stays has a positioning pin insertion hole through which the positioning pin is inserted to define a rotational axis of said housing.

6. The image forming apparatus of claim 1, wherein:
said housing has a first driver insertion hole; and
said at least one stay has a second driver insertion hole, wherein said first and second driver insertion holes are configured such that said housing can be rotated by inserting an end of a driver into said first and second driver insertion holes and by rotating the driver.

7. The image forming apparatus of claim 1, further comprising a scale provided on said at least one scale and configured to indicate an angular position of said housing.

8. The image forming apparatus of claim 7, wherein said scale includes a division having a function of measuring an amount of a deviation from a right angle formed by the direction of the light beam relative to the direction in which the surface of the photoconductor moves.

9. The image forming apparatus of claim 7, wherein said scale includes a division which is sized such that when an image having a longitudinal line and a widthwise line extending from an end point of the longitudinal line at a right angle over a maximum widthwise length of the image to an end point of the widthwise line is formed, a rotation of said housing relative to said at least one stay over one increment of the division corrects a deviation of an angular position of the scanning direction from a right angle in an amount corresponding to a distance of 0.5 mm or 1 mm between the end point of the longitudinal line and a point on either the longitudinal line or an extended longitudinal line extending from the end point of the longitudinal line, where the point is an intersection of a line extended from the end point of the widthwise line perpendicularly crossing the longitudinal line.

10. The image forming apparatus of claim 7, wherein said scale includes a division which is made such that when an image having a longitudinal line and a widthwise line extending from an end point of the longitudinal line at a right angle over a maximum widthwise length of the image to an end point of the widthwise line is formed, rotation of said housing relative to said at least one stay over one increment of the division corrects a deviation of 0.5 mm or 1.0 mm between the end point of the longitudinal line from a point on either the longitudinal line or an extended longitudinal line extending from the end point of the longitudinal line, where the point is an intersection of a line extended from the end point of the widthwise line perpendicularly crossing the longitudinal line.

11. The image forming apparatus of claim 1, wherein:
said photoconductor comprises a photoconductive drum having a rotational axis; and
said housing is mounted to said stay so as to be rotatable in a plane substantially parallel with said rotational axis of said photoconductive drum.

12. An image forming apparatus, comprising:
a photoconductor;
a light source configured to emit a light beam;
a housing;
a scanning device configured to guide a light beam emitted from said light source onto a surface of said photoconductor so as to scan a surface of said photoconductor with the light beam to form a latent image thereupon;
a developing device configured to develop the latent image with toner to form an image;
a stay positioned and configured to rotatably mount said housing to the image forming apparatus such that a relative angular position of said housing and said photoconductor is adjustable by rotating said housing, thereby a scanning line of a light beam guided by said scanning device can be aligned to a longitudinal direction of said photoconductor by rotating said housing.

13. A method of making an image forming apparatus, comprising the steps of:
mounting a light source and a scanning device to a housing; and
rotatably mounting the housing to the image forming apparatus with a stay such that the housing is rotatable relative to a photoconductor included in the image forming apparatus, thereby a scanning line of a light beam guided by said scanning device can be aligned to a longitudinal direction of said photoconductor by rotating said housing.

14. The method according to claim 13, wherein said step of rotatably mounting comprises mounting the housing such that the relative angular position of the housing and the photoconductor can be adjusted by rotating the housing, thereby an angle of a scanning direction of the light beam relative to a direction in which a surface of the photoconductor moves, is adjusted to a right angle.

15. The method according to claim 13, wherein said step of rotatably mounting comprises mounting the housing such that said housing rotates in a plane substantially parallel to a rotational axis of said photoconductor, wherein said photoconductor is a photoconductive drum.

16. A method of making an image forming apparatus including a photoconductor, a light source that emits a light beam, a scanning device that guides a light beam emitted from the light source onto a surface of the photoconductor so as to scan the surface of the photoconductor with the light beam to form a latent image thereupon, and a developing device to develop the latent image with toner to form a toner image, the method comprising the steps of:
mounting the light source and the scanning device to a housing;
supporting the housing with a stay and mounting the housing to the image forming apparatus via the stay such that the housing is rotatable relative to the photoconductor; and
adjusting the positional relationship between the housing and the photoconductor by aligning a scanning line of a light guided by said scanning device to a longitudinal direction of the photoconductor such that the toner image is formed in a substantially rectangular form by way of rotating the housing.

* * * * *